United States Patent [19]

Chiba

[11] Patent Number: 5,243,429
[45] Date of Patent: Sep. 7, 1993

[54] COMBINED IMAGE PRODUCING APPARATUS

[75] Inventor: Yoshiharu Chiba, Saitama, Japan

[73] Assignee: Pioneer Electronic Corporation, Tokyo, Japan

[21] Appl. No.: 915,509

[22] Filed: Jul. 20, 1992

[30] Foreign Application Priority Data

Nov. 8, 1991 [JP] Japan .................... 3-293409

[51] Int. Cl.⁵ ........................................... H04N 5/265
[52] U.S. Cl. ........................................ 358/183; 358/22; 358/167; 358/36
[58] Field of Search ............... 358/183, 22, 170, 171, 358/172, 165, 167, 464, 465, 36; 582/50-53

[56] References Cited

U.S. PATENT DOCUMENTS

| | | | |
|---|---|---|---|
| 2,244,239 | 6/1941 | Blumlein et al. | 358/183 |
| 3,444,380 | 5/1969 | Webb | 358/160 X |
| 3,678,182 | 5/1974 | Boxman et al. | 358/22 |
| 4,356,512 | 10/1982 | Robers | 358/183 |
| 4,506,382 | 3/1985 | Hada et al. | 358/167 X |
| 4,703,342 | 10/1987 | Takahashi | 358/22 X |
| 4,811,104 | 3/1989 | Kawabe | 358/183 |

OTHER PUBLICATIONS

Parr, E. A., "Video Effects Unit", Television, Jan. 1977, vol. 27, No. 3, pp. 158-160.

Hathaway et al., "Video Inset System", Electronics, pp. 150-153, Apr. 1953.

Bassetti et al., "Narrow Line Detection for a Flying Spot Scanner", IBM Technical Disclosure Bulletin, vol. 23, No. 2, Jul. 1980.

Primary Examiner—James J. Groody
Assistant Examiner—David E. Harvey
Attorney, Agent, or Firm—Finnegan, Henderson, Farabow, Garrett & Dunner

[57] ABSTRACT

While a main video signal is selectively replaced by a sub-video signal during the periods when the sub-video signal, typically its luminance signal, is larger than a first predetermined value, the sub-video signal is clamped at a second predetermined value that is smaller than the first predetermined value when the line non-correlation or field non-correlation is detected in the sub-video signal.

6 Claims, 6 Drawing Sheets

COMBINED IMAGE PRODUCING APPARATUS

BACKGROUND OF THE INVENTION

The present invention relates to an image reproducing apparatus which selectively superimposes a sub-video signal on a main video signal to produce a combined image.

FIG. 1 shows a configuration of an example of an image reproducing apparatus of the above kind. In FIG. 1, a main video signal source 1, for instance, a VTR (video tape recorder), outputs a main video signal representing a video image such as a usual moving picture. A sub-video signal source 2, for instance, a VDR (video disc recorder), outputs a sub-video signal representing characters or a graphic image. The main video signal from the main video signal source 1 is provided to a video monitor 4 such as a CRT display via a switch 3. The sub-video signal from the sub-video signal source 2 is provided not only to the switch 3 but to a comparator 5. As shown in part (a) of FIG. 2, the comparator 5 compares the level of the sub-video signal SUB VIDEO with a first predetermined value REF1. In the sub-video signal SUB VIDEO, portions to be superimposed that represent characters etc. are given white or other colors a little darker than white while the remaining portions are given black or dark colors. Therefore, the portions to be superimposed have a higher signal level. The comparator 5 outputs a first changeover signal CHANGE while the level of the sub-video signal SUB VIDEO is larger than the first predetermined value REF1. In response to the first changeover signal CHANGE, the switch 3 provides the sub-video signal, instead of the main video signal, to the video monitor 4. Thus, the video monitor 4 displays a combined video image in which, for instance, characters are superimposed on a moving picture.

In this type of conventional image reproducing apparatus, however, it may be the case that the sub-video signal from the sub-video signal source 2 includes a high-level pulse such as noise (shown by symbol A in FIG. 2). In such a case, if a mixed pulse has an amplitude larger than the predetermined value REF1, it is provided to the video monitor 4 with the switch 3 being changed over during that portion. That is, noise is mixed into the main video signal in its picture section that actually appears on the video monitor 4, which will impair the quality of a combined image.

SUMMARY OF THE INVENTION

An object of the present invention is to provide an image reproducing apparatus which can produce a combined image having satisfactory quality even in the case where a high-level pulse is mixed into a sub-video signal.

According to the invention, an image reproducing apparatus comprises:

means for replacing a main video signal with a sub-video signal during a period when the sub-video signal is larger than a first predetermined value;

means for detecting line non-correlation or field non-correlation in the sub-video signal; and means for clamping the sub-video signal at a second predetermined value that is smaller than the first predetermined value when the detecting means detects the line non-correlation or field non-correlation.

DESCRIPTION OF THE PREFERRED EMBODIMENTS

Embodiments of the present invention are described hereinafter with reference to the accompanying drawings.

Figure 1:
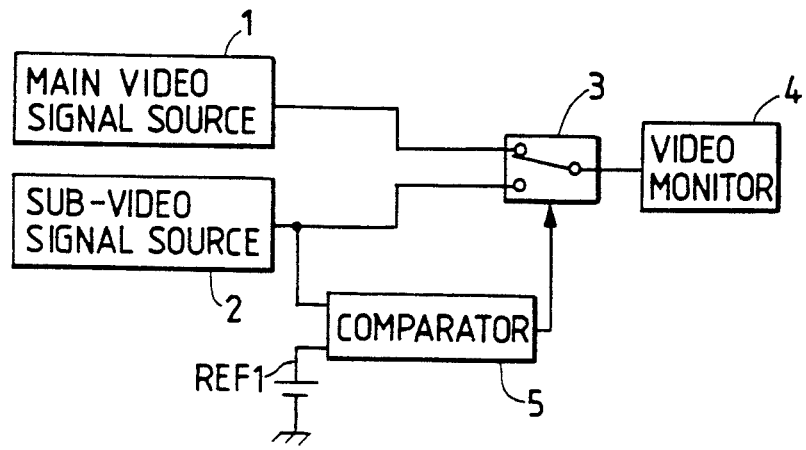
FIG. 1 is a block diagram showing a configuration of a conventional image reproducing apparatus.
Figure 2:
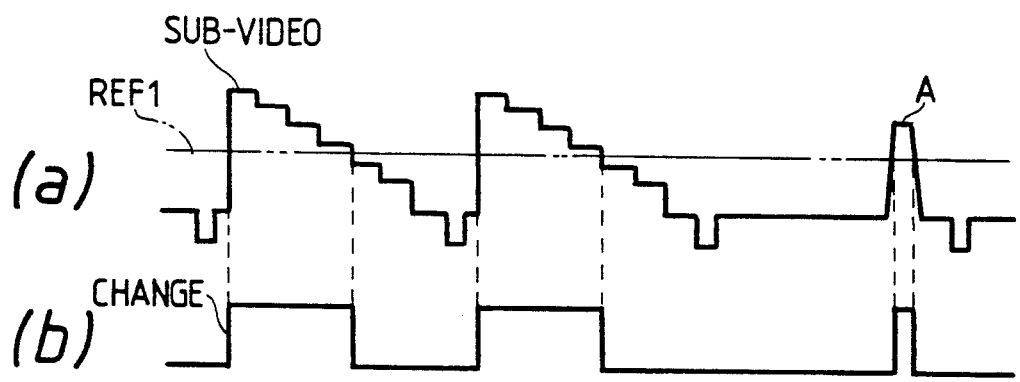
FIG. 2 is a waveform diagram to illustrate the operation of the FIG. 1 apparatus.
Figure 3:
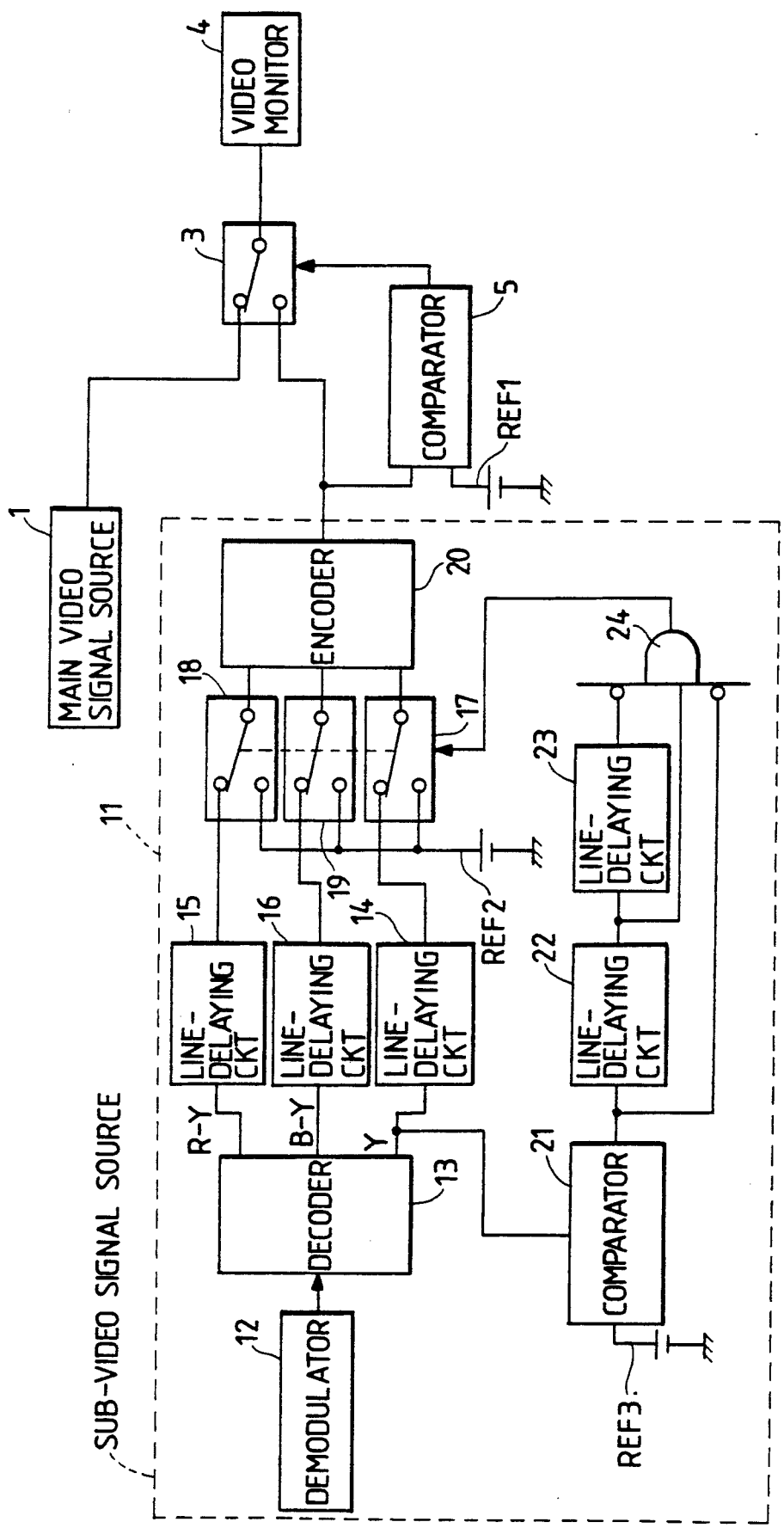
FIG. 3 is a block diagram showing an image reproducing apparatus according to an embodiment of the present invention.

An image reproducing apparatus according to an embodiment of the invention is shown in FIG. 3, in which the same parts as in the conventional apparatus of FIG. 1 are represented by the same reference numerals. In a sub-video signal source 11, for instance, VDR, an RF signal is read out by a pickup (not shown), and demodulated by a demodulator 12 to become a color composite video signal. A luminance signal Y and color difference signals R-Y and B-Y are separated from the color composite video signal while being timed to each other, and provided to line-delaying circuits 14–16, respectively. The line-delaying circuits 14–16 delay the input signal by 1H (one horizontal scanning period). The delayed output signals from the line-delaying circuits 14–16 are provided to changeover switches 17–19, respectively. The changeover switches 17–19, which operate in link motion, selectively output the output signals of the line-delaying circuits 14–16 or a second predetermined value REF2 in accordance with a second reference signal (described later). The second predetermined value REF2 is set at a value smaller than the first predetermined value REF1. Receiving the output signals of the changeover switches 17–19, an encoder 20 produces a color composite video signal, which is provided to a switch 3 and a comparator 5 as an output signal of the sub-video signal source 11, i.e., as a sub-video signal.

A comparator 21 compares the luminance signal Y sent from the decoder 13 with a third predetermined value REF3, and outputs a high-level signal when the luminance signal Y is larger than the third predetermined value REF3. The third predetermined value REF3 is set at a value approximately equal to the first predetermined value REF1. Two series-connected line-delaying circuits 22 and 23 and an AND circuit 24 are provided on the output side of the comparator 21. Each of the line-delaying circuits 22 and 23 delays the input signal by 1H. The AND circuit 24 takes logical multiplication of the outputs of the comparator 21 and the line-delaying circuits 22 and 23. A high-level signal (logic value "1") from the AND circuit 24 is provided to the changeover switches 17–19 as the second changeover signal. The output signals of the comparator 21 and the line-delaying circuit 23 are input to inverting terminals of the AND circuit 24.

With the above construction, the color composite video signal produced by the demodulator 12 of the sub-video signal source 11 is processed by the decoder 13 to produce the luminance signal Y and the color difference signals R-Y and B-Y that are timed with each other, which are then delayed by 1H by the line-delaying circuits 14–16, respectively. In the normal operation, the 1H-delayed luminance signal Y and color difference signals R-Y and B-Y are provided via the respective changeover switches 17–19 to the encoder 20, where they are returned to the color composite video signal. The color composite video signal thus restored is provided, as the sub-video signal output from the sub-video signal source 11, not only to the switch 3 but to the comparator 5. Comparing the sub-video signal with the first predetermined value REF1, the comparator 5 outputs the first changeover signal when the sub-video signal is larger than the first predetermined value REF1, that is, during the portions of the sub-video signal that represent characters or the like. In response to the first changeover signal, the switch 3 provides the video monitor 4 with the sub-video signal instead of the main video signal sent from the main signal source 1.

The apparatus of FIG. 3 detects the non-correlation between adjacent lines of the same field, as is explained below. Comparing the luminance signal Y from the decoder 13 with the third predetermined value REF3, the comparator 21 outputs a low-level signal (logic value "0") when the luminance signal Y is smaller than the third predetermined value REF3, and outputs a high-level signal (logic value "1") when the luminance signal Y is larger than the third predetermined value REF3. The output signal of the comparator 21 is delayed by 1H in each of the line-delaying circuits 22 and 23. Since the AND circuit 24 takes logical multiplication of the output signals of the comparator 21 and line-delaying circuits 22 and 23, the AND circuit 24 outputs a low-level signal while the comparator 21 outputs the low-level signal, that is, while the luminance signal is smaller than the third predetermined value REF3. In this case, as described above, the changeover switches 17–19 provide the 1H-delayed luminance signal Y and color difference signals R-Y and B-Y to the encoder 20, respectively.

On the other hand, where a high-level pulse is mixed into the color composite video signal from the demodulator 12, the apparatus operates in the following manner. This is exemplified in FIG. 4, in which the color composite video signal consists of a first field having lines A0, A1, A2, . . . and a second field having lines B0, B1, B2, . . . , and a high-level pulse a is mixed into line A1. In response to the high-level pulse a, a high-level signal is output from the comparator 21. Then, after a lapse of 1H, only the output signal of the line-delaying circuit 22 is high, so that a high-level signal is output from the AND circuit 24 and provided to the changeover switches 17–19 as the second changeover signal. In response, the changeover switches 17–19 are changed over to output the second predetermined value REF2. Receiving the second predetermined value REF2 from each of the changeover switches 17–19, the encoder 20 produces the color composite video signal such that each of the luminance signal and the two color difference signals has a constant level of the second predetermined value REF2. If a pulse B having an amplitude larger than the third predetermined value REF3 is mixed into the sub-video signal SUB VIDEO from the demodulator 12 as shown in part (a) of FIG. 5, the level of the sub-video signal as output from the encoder 20 is kept at the second predetermined value REF2 during the period corresponding to the duration of the pulse B, as shown in part (b) of FIG. 5. In this period, since the level of the color composite video signal from the encoder 20, i.e., the second predetermined value REF2 is smaller than the first predetermined value REF1, the comparator 5 does not output the first changeover signal CHANGE as shown in part (c) of FIG. 5, so that the main video signal is provided from the main video signal source 1 to the video monitor 4 via the switch 3. In this manner, there can be avoided the problem that the pulse B is provided to the video monitor 4. Although for convenience the sub-video signal waveforms of parts (a) and (b) of FIG. 5 are drawn so as to be timed with each other, actually the waveform of part (b) is delayed from that of part (a) by 1H.

Figure 4:
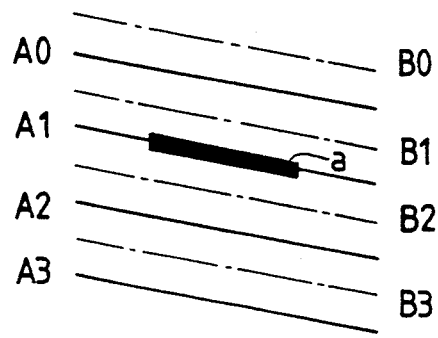
FIG. 4 shows scanning lines to illustrate the operation of the FIG. 3 apparatus.
Figure 5:
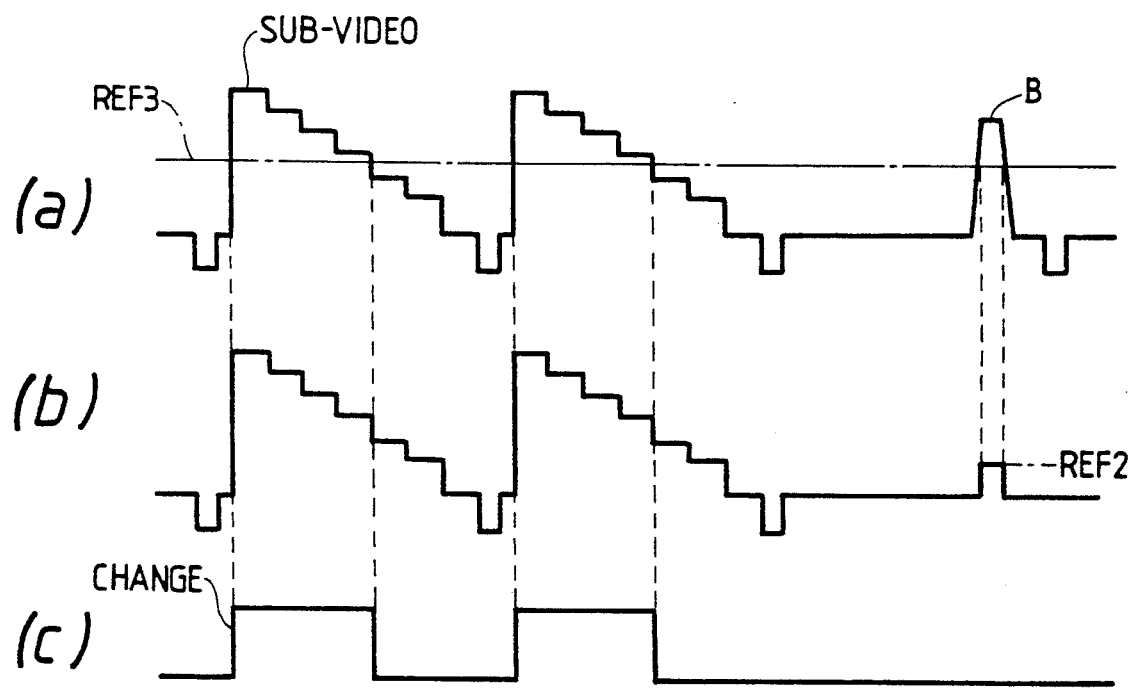
FIG. 5 is a waveform diagram to illustrate the operation of the FIG. 3 apparatus.

In the apparatus of FIG. 3, as described above, since the non-correlation between the two adjacent lines is detected, even if line A0 of FIG. 4, for instance, has a portion whose luminance signal level is larger than the third predetermined value REF3, the output signal level of the AND circuit 24 remains low as long as the luminance signal level of the corresponding part of preceding line A0 is also larger than the third predetermined value REF3. As a result, in such a period, the changeover switches 17–19 provide the encoder 20 with the luminance signal Y and the color difference signals R-Y and B-Y that have been produced by the decoder 13 and then delayed by 1H.

In the above embodiment, since the sub-video signal is output after being delayed by 1H. the main video signal may also be delayed by 1H.

Figure 6:
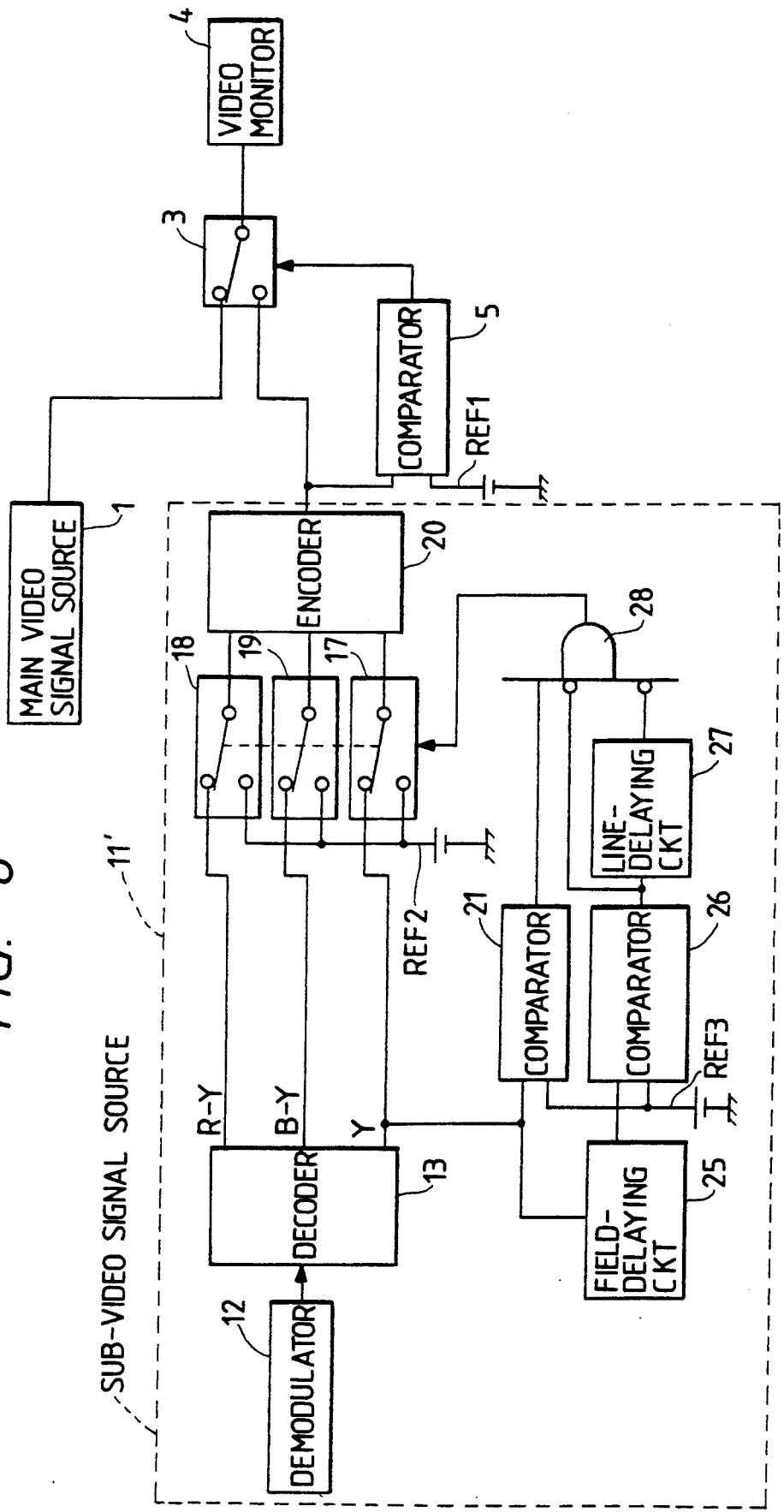
FIG. 6 is a block diagram showing an image reproducing apparatus according to another embodiment of the invention.

An image reproducing apparatus according to another embodiment of the invention is shown in FIG. 6, in which the same parts as the apparatus of FIG. 3 are represented by the same reference numerals. In this apparatus, the luminance signal Y and the color difference signals R-Y and B-Y are separated from the color composite video signal by the decoder 13, and then directly provided to the changeover switches 17–19. The luminance signal Y from the decoder 13 is provided to a field-delaying circuit 25 as well as to the comparator 21. The field-delaying circuit 25 delays the luminance signal Y as output from the decoder 13 by one field (i.e., one vertical scanning period). Connected to the output of the filed-delaying circuit 25, a comparator 26 compares the one-field delayed luminance signal Y with the third predetermined value REF3, and outputs a high-level signal when the former is larger than the latter. The output of the comparator 26 is provided to a line-delaying circuit 27 and an AND circuit 28. The one-line delaying circuit 27 delays the output signal of the comparator 26 by 1H. The AND circuit 28 takes logical multiplication of the outputs of the comparators 21 and 26 and line-delaying circuit 27. A high-level signal (logic value "1") from the AND circuit 28 is provided to the changeover switches 17–19 as the second changeover signal. The output signals of the comparator 26 and line-delaying circuit 27 are input to inverting terminals of the AND circuit 28.

With the above construction, the color composite video signal produced by the demodulator 12 of the sub-video signal source 11 is processed by the decoder 13 to produce the luminance signal Y and the color difference signals R-Y and B-Y that are timed with each other. In the normal operation, the luminance signal Y and the color difference signals R-Y and B-Y are provided via the respective changeover switches 17-19 to the encoder 20, where they are returned to the color composite video signal. As in the apparatus of FIG. 3, the color composite video signal thus restored is provided, as the sub-video signal output from the sub-video signal source 11', not only to the switch 3 but to the comparator 5. Comparing the sub-video signal with the first predetermined value REF1, the comparator 5 outputs the first changeover signal when the sub-video signal is larger than the first predetermined value REF1. In response to the first changeover signal, the switch 3 provides the video monitor 4 with the sub-video signal instead of the main video signal from the main signal source 1.

The apparatus of FIG. 6 detects the non-correlation between two consecutive fields, as is explained below. The comparator 21 compares the luminance signal Y from the decoder 13 with the third predetermined value REF3. The output signal of the comparator 21 is directly provided to the AND circuit 28. Further, after being delayed by the field-delaying circuit 25 by one field, the luminance signal Y from the decoder 13 is also compared with the third predetermined value REF3 in the comparator 26. The output signal of the comparator 26 is provided to the AND circuit 28 not only directly but after being delayed by 1H by the line-delaying circuit 27. The AND circuit 28 outputs a low-level signal while the luminance signal Y is smaller than the predetermined value REF3 and so the comparators 21 and 26 output a low-level signal. In this case, the changeover switches 17-19 provide the luminance signal Y and the color difference signals R-Y and B-Y to the encoder 20, respectively.

Figure 7:
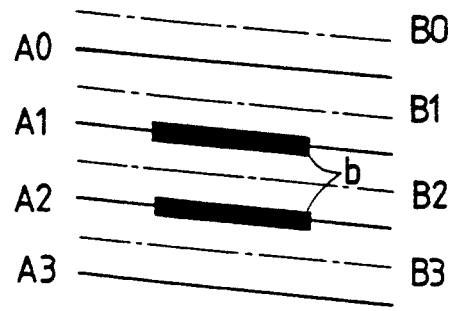
FIG. 7 shows scanning lines to illustrate the operation of the FIG. 6 apparatus.

On the other hand, where a high-level pulse is mixed into the color composite video signal from the demodulator 12, the apparatus operates in the following manner. This is exemplified in FIG. 7, in which the color composite video signal consists of a first field having lines A0, A1, A2, ... and a second field having lines B0, B1, B2, ..., and high-level pulses b are mixed into adjacent lines A1 and A2. In response to the high-level pulse b, a high-level signal is output from the comparator 21. If no high-level pulse is mixed into the preceding field, i.e., the second field of the preceding frame, the output signal of the field-delaying circuit 25 is smaller than the third predetermined value REF3, so that the output signal level of both of the comparator 26 and the line-delaying circuit 27 is low. Therefore, a high-level signal is output from the AND circuit 28 and provided to the changeover switches 17-19 as the second changeover signal. In response, the changeover switches 17-19 are changed over to output the second predetermined value REF2. Receiving the second predetermined value REF2 from each of the changeover switches 17-19, the encoder 20 produces the color composite video signal such that each of the luminance signal and the two color difference signals has a constant level of the second predetermined value REF2. In this period, since the level of the color composite video signal from the encoder 20 is forced to be smaller than the first predetermined value REF1, the comparator 5 does not output the first changeover signal, so that the main video signal is provided from the main video signal source 1 to the video monitor 4 via the switch 3. In the example of FIG. 7, the above operation is performed for each of the high-level pulses b mixed into lines A1 and A2.

In the apparatus of FIG. 6, as described above, since the non-correlation between the two consecutive fields is detected, even if line A1 of FIG. 7, for instance, has a portion whose luminance signal level is larger than the third predetermined value REF3, the output signal level of the AND circuit 28 remains low as long as the luminance signal level of the corresponding part of line B1 or B0 of the preceding field is also larger than the third predetermined value REF3. As a result, in such a period, the changeover switches 17-19 provides the encoder 20 with the luminance signal Y and the color difference signals R-Y and B-Y that have been produced by the decoder 13.

Figure 9:
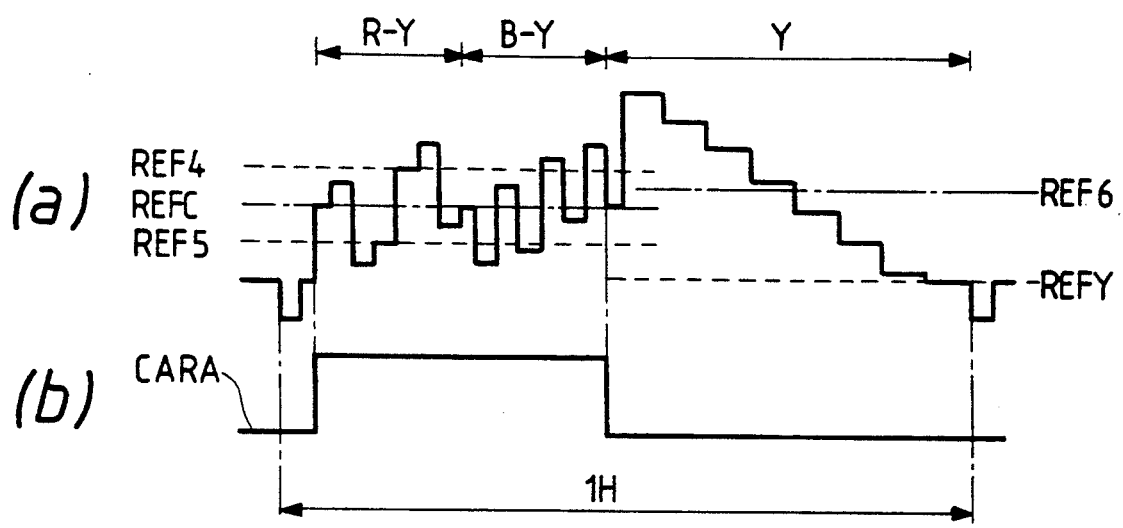
FIG. 9 is a waveform diagram to illustrate the operation of the FIG. 8 apparatus.
Figure 8:
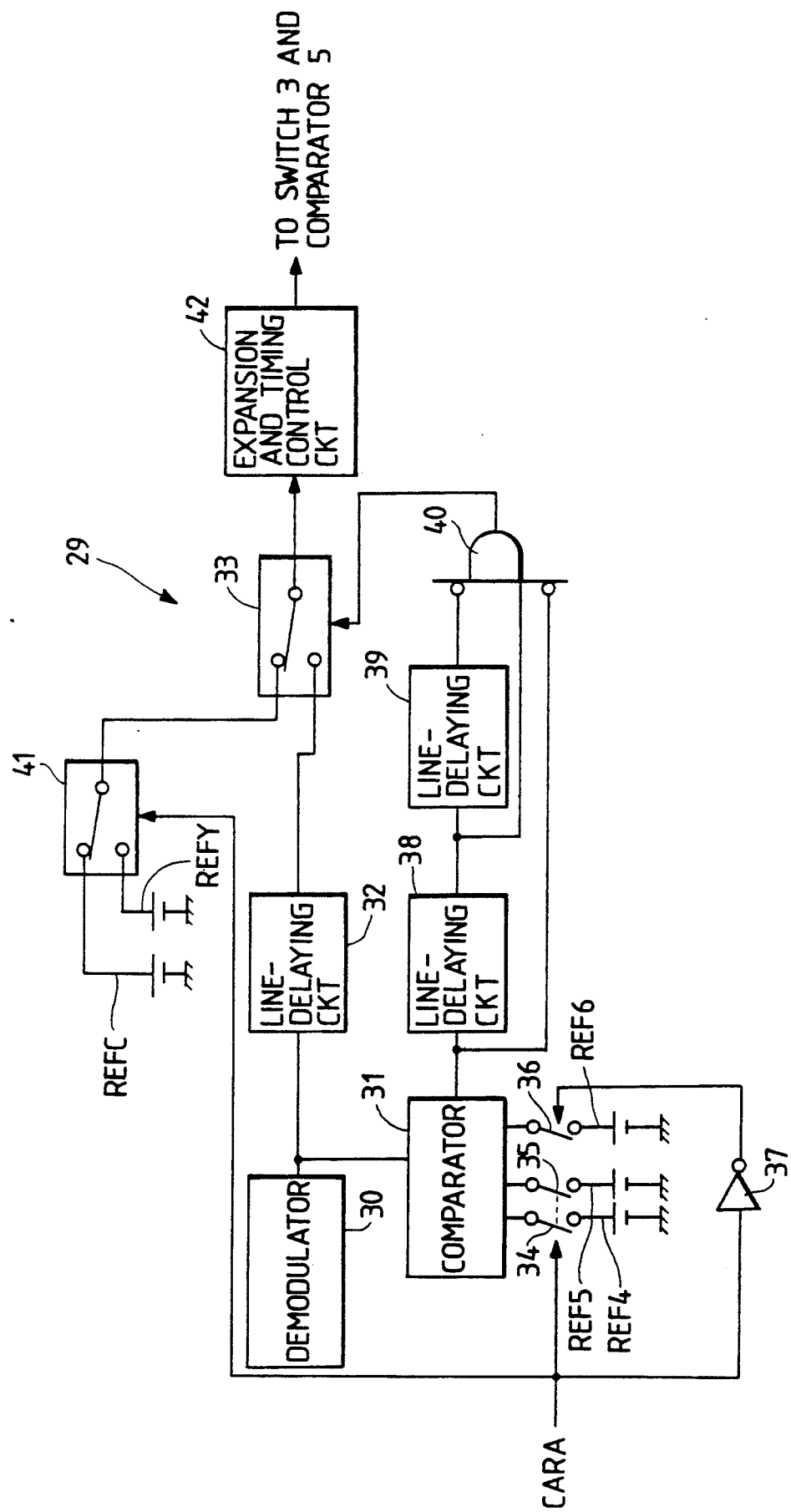
FIG. 8 is a block diagram showing an image reproducing apparatus according to still another embodiment of the invention.

FIG. 8 shows an image reproducing apparatus according to another embodiment of the invention. This embodiment is directed to the case in which, as shown in part (a) of FIG. 9, a compressed video signal is employed that is produced by combining time-compressed color difference signals R-Y and B-Y and luminance signal Y in one horizontal scanning period. A demodulator 30 of a sub-video signal source 29 produces such a compressed video signal, which is provided to a comparator 31 and to a switch 33 via a line-delaying circuit 32. During the color difference signal sections, the comparator 31 compares the compressed video signal with predetermined values REF4 and REF5, and outputs a high-level signal when the compressed video signal is larger than the predetermined value REF4 or smaller than the predetermined value REF5. During the luminance signal sections, the comparator 31 compares the compressed video signal with a predetermined value REF6, and outputs a high-level signal when the former is larger than the latter. The changeover between the comparison with the predetermined values REF4 and REF5 and the comparison with the predetermined value REF6 is performed by switches 34-36. A discrimination signal CARA, whose level during the color difference signal sections is reverse to that during the luminance signal sections as shown in part (b) of FIG. 9, is provided to the switches 34 and 35 as a changeover signal. The discrimination signal CARA as inverted by an inverter 37 is provided to the switch 36 as a changeover signal. An output signal of the comparator 31 is provided to an AND circuit 40 via two line-delaying circuits 38 and 39. The AND circuit 40 takes logical multiplication of the outputs of the comparator 31 and two line-delaying circuits 38 and 39. The switch 33 is changed over in accordance with the output signal level of the AND circuit 40. A switch 41, that is connected to the switch 33, outputs either of predetermined values REFC and REFY in accordance with the discrimination signal CARA. The output signal of the switch 33 is provided to an expansion and timing control circuit 42, which converts the compressed video signal to a color composite video signal. The output signal of the expansion and timing control circuit 42 is provided to the switch 3 and the comparator 5 (not shown in FIG. 8).

With the above construction, during the color difference signal sections of the compressed video signal from the demodulator 30, the switches 34 and 35 are turned on and the switch 36 is turned off in accordance with the discrimination signal CARA. The predetermined value REFC is selected by the switch 41 and provided to the switch 33. If the compressed video signal, i.e., the color difference signal is larger than the predetermined value REF4 or smaller than the predetermined value REF5, the comparator 31 outputs a high-level signal judging that a noise pulse etc. is mixed into the video signal. On the other hand, during the luminance signal sections of the compressed video signal, the switches 34 and 35 are turned off and the switch 36 is turned on in accordance with the discrimination signal CARA. Further, the predetermined value REFY is selected by the switch 41 and provided to the switch 33. If the compressed video signal, i.e., the luminance signal is larger than the predetermined value REF6, the comparator 31 outputs a high-level signal judging that a noise pulse etc. is mixed into the video signal. The remaining operation is similar to that of the FIG. 3 apparatus. That is, when the non-correlation between two adjacent lines is detected based on the output signal of the comparator 31, a changeover signal is produced by the AND circuit 40 to replace the compressed video signal with the predetermined value REFC during the color difference signal sections and with the other predetermined value REFY during the luminance signal sections.

Although the above embodiments are directed to the case of processing the analog video signal, the invention is applicable to the case of handling a digital video signal.

According to the invention, while the sub-video signal is selectively superimposed on the main video signal by outputting the sub-video signal, instead of the main video signal, to the video monitor during the periods when the sub-video signal is larger than the first predetermined value, the sub-video signal is clamped at the second predetermined value that is smaller than the first predetermined value in the sub-video signal generation system, to output the main video signal without alteration when the line non-correlation or field non-correlation is detected in the sub-video signal. Therefore, even if a high-level pulse such as noise is mixed into the sub-video signal, the main video signal is provided to the video monitor rather than the sub-video signal to prevent such a high-level pulse from being sent to the video monitor, whereby satisfactory quality of combined images can be maintained.

What is claimed is:

1. An image reproducing apparatus comprising:
    means for replacing a main video signal with a sub-video signal during a period when the sub-video signal is larger than a first predetermined value;
    means for detecting line non-correlation or field non-correlation in the sub-video signal; and
    means for clamping the sub-video signal at a second predetermined value that is smaller than the first predetermined value when the detecting means detects the line non-correlation or field non-correlation.

2. The apparatus of claim 1, wherein the detecting means comprises means for comparing the sub-video signal with a third predetermined value, and means for detecting the line non-correlation based on comparison results of the comparing means with respect to a subject line and two lines adjacent to the subject line.

3. The apparatus of claim 2, wherein a luminance signal of the sub-video signal is compared with the third predetermined value.

4. The apparatus of claim 2, wherein the sub-video signal is formed such that a luminance signal and color difference signals are compressed and combined in a time-divisional manner, and wherein the second and third predetermined values are provided for each of the luminance signal and the color difference signals.

5. The apparatus of claim 2, wherein the clamping means comprises means for delaying the sub-video signal by one line.

6. The apparatus of claim 1, wherein the detecting means comprises first judging means for judging whether a luminance signal of a subject line of the sub-video signal is larger than a third predetermined value, second judging means for judging whether a luminance signal of a first line corresponding to the subject line in a field preceding a field of the subject line is larger than the third predetermined value, and means for detecting the field non-correlation based on a judgment result of the first judging means and judgment results of the second judging means with respect to the first line and a line preceding the first line.

* * * * *